(12) United States Patent
Forte et al.

(10) Patent No.: US 10,343,708 B2
(45) Date of Patent: Jul. 9, 2019

(54) STEERING COLUMN FOR A MOTOR VEHICLE

(71) Applicants: THYSSENKRUPP PRESTA AG, Eschen (LI); thyssenkrupp AG, Essen (DE)

(72) Inventors: Sebastian Forte, Mauren (LI); Hieronymus Schnitzer, Gamprin (LI); Daniel Kreutz, Feldkirch (AT); Thomas Werner Heitz, Mauren (LI)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 102 days.

(21) Appl. No.: 15/567,841

(22) PCT Filed: Apr. 8, 2016

(86) PCT No.: PCT/EP2016/057821
§ 371 (c)(1),
(2) Date: Oct. 19, 2017

(87) PCT Pub. No.: WO2016/169793
PCT Pub. Date: Oct. 27, 2016

(65) Prior Publication Data
US 2018/0093697 A1    Apr. 5, 2018

(30) Foreign Application Priority Data

Apr. 21, 2015 (DE) .................. 10 2015 207 230

(51) Int. Cl.
*B62D 1/19* (2006.01)
*B62D 1/184* (2006.01)
*B62D 1/185* (2006.01)

(52) U.S. Cl.
CPC ............. *B62D 1/195* (2013.01); *B62D 1/184* (2013.01); *B62D 1/185* (2013.01)

(58) Field of Classification Search
CPC ........ B62D 1/184; B62D 1/185; B62D 1/192; B62D 1/195
See application file for complete search history.

(56) References Cited

U.S. PATENT DOCUMENTS 5,692,778 A * 12/1997 Cymbal ................. B62D 1/195
280/777
2008/0224459 A1  9/2008 Oh
(Continued)

FOREIGN PATENT DOCUMENTS

CN    201362295 Y    12/2009
CN    103608240 A    2/2014
(Continued)

OTHER PUBLICATIONS

English Translation of International Search Report issued in PCT/EP2016/057821 dated Jul. 5, 2016 (dated Jul. 12, 2016).
English abstract for DE102008060225A.

*Primary Examiner* — Ruth Ilan
(74) *Attorney, Agent, or Firm* — thyssenkrupp North America, Inc.

(57) ABSTRACT

A steering column may comprise an adjusting unit that holds a steering spindle rotatably mounted about a longitudinal axis, a holding unit that receives the adjusting unit, a clamping device that locks the adjusting unit relative to the holding unit in a fixing position and permits adjustment in an unlocked position, and an energy absorption element attached to the adjusting unit and extending through an opening of a wedging housing parallel to the longitudinal axis. The energy absorption element is longitudinally movable in the opening in the unlocked position and lockable within the opening in the fixing position. The opening may (Continued)

have a wedging section with inner wall regions that converge longitudinally. A wedging element is movable into the wedging section and disposed between the energy absorption element and the inner wall regions. The wedging element and the energy absorption element, measured transversely to the longitudinal direction, may be larger than a shortest cross section of the wedging section.

12 Claims, 9 Drawing Sheets

(56) References Cited

U.S. PATENT DOCUMENTS

| | | | | |
|---|---|---|---|---|
| 2009/0256342 | A1* | 10/2009 | Cymbal | B62D 1/192 280/777 |
| 2010/0282016 | A1* | 11/2010 | Oehri | B62D 1/184 74/493 |
| 2014/0260762 | A1 | 9/2014 | Streng | |
| 2015/0013493 | A1 | 1/2015 | Back | |
| 2015/0047456 | A1 | 2/2015 | Heitz | |
| 2015/0135882 | A1 | 5/2015 | Rauber | |
| 2015/0314801 | A1 | 11/2015 | Gstohl | |
| 2015/0367876 | A1 | 12/2015 | Heitz | |
| 2015/0375767 | A1 | 12/2015 | Agbor | |
| 2016/0121920 | A1 | 5/2016 | Klepp | |
| 2017/0129531 | A1 | 5/2017 | Regner | |
| 2018/0037250 | A1* | 2/2018 | Kreutz | B62D 1/184 |
| 2018/0281841 | A1* | 10/2018 | Kurz | B62D 1/187 |
| 2018/0297626 | A1* | 10/2018 | Huber | B62D 1/192 |

FOREIGN PATENT DOCUMENTS

| | | | | |
|---|---|---|---|---|
| DE | 19857693 | A1 * | 7/1999 | B62D 1/195 |
| DE | 102008060225 | A | 6/2010 | |
| DE | 102012005434 | B | 4/2013 | |
| DE | 102012101494 | B | 5/2013 | |
| DE | 102012104644 | B | 8/2013 | |
| DE | 102012111890 | B | 12/2013 | |
| DE | 102013001442 | A | 3/2014 | |
| DE | 102013101045 | B | 5/2014 | |
| DE | 102013104958 | B | 7/2014 | |
| DE | 102014104354 | B | 4/2015 | |
| FR | 2727481 | A1 * | 5/1996 | B62D 1/185 |
| FR | 2834958 | A1 * | 7/2003 | B62D 1/192 |
| JP | 2002059852 | A | 2/2002 | |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2016/057821, filed Apr. 8, 2016, which claims priority to German Patent Application No. DE 10 2015 207 230.4 filed Apr. 21, 2015, the entire contents of both of which are incorporated herein by reference.

FIELD

The present disclosure generally relates to steering columns, including steering columns in motor vehicles with improved energy absorption and adjustability characteristics.

BACKGROUND

To adapt the steering wheel position to the seating position of the driver of a motor vehicle, steering columns in various embodiments are known in the prior art. In addition to height adjustment by adjustment of the slope of the steering column, it is possible in steering columns to position the steering wheel attached to the rear end of the steering spindle in the interior of the vehicle by length adjustment in the direction of the steering column longitudinal axis.

The ability for length adjustment is achieved by virtue of the fact that the adjusting unit, which comprises the steering spindle rotatably mounted in a casing tube, can be adjusted telescopically in the longitudinal direction relative to the holding or carrier unit, which provides a steering column holder connected in a fixed manner to the vehicle body, and can be fixed in different longitudinal positions by means of a releasable clamping device, i.e. can be fixed releasably. The clamping device, also referred to as a fixing device, acts on the adjusting unit held by the holding unit, wherein movement of the adjusting unit relative to the holding unit in the longitudinal direction to adjust the steering wheel position is possible in the open state of the clamping device—also referred to as the unlocked position or release position—and, in the closed state—referred to as the fixing position or locking position—the adjusting unit is clamped to the holding unit and, in normal driving mode, the steering wheel position is fixed under the mechanical loads to be expected.

One known effective measure for improving occupant safety in a vehicle collision, the "event of a crash" or frontal impact of the vehicle, in which the driver strikes the steering wheel at high speed, is to make the steering column collapsible in the longitudinal direction, even in the fixing position of the clamping device, if a high force exceeding a limit which only occurs in the event of a crash is exerted on the steering wheel. In order to ensure controlled braking of a body striking the steering wheel, an energy absorption device is coupled between the holding unit and the adjusting unit, which are clamped and fixed to one another by the clamping device in the normal mode, as described, but are pushed together relative to one another in the event of a crash. This converts the kinetic energy introduced into plastic deformation of an energy absorption element, e.g. by tearing a tear tab or bending an elongate bending element, e.g. a bending wire or bending strip, or by expanding a slotted hole by means of a bolt or by stretching a sheet-metal strip or severing a burr by means of a plane.

A steering column of the type in question is described in DE 10 2008 060 225 A1. The clamping device described therein comprises a clamping mechanism having an actuating element designed as a clamping spindle. A rotary movement of the clamping spindle exerted via an operating lever is converted by the clamping mechanism into a clamping stroke, which exerts a force on the holding unit in the transverse direction, with the result that the adjusting device mounted therein is firmly clamped in a manner comparable to the operation of a clamp. Nonpositive fixing of the adjusting unit in the longitudinal direction is thereby achieved.

In the case of the abovementioned construction of a steering column, the activation of the energy absorption device (crash device) is accomplished by means of the clamping device during the fixing of the adjusting unit. Here, a fastening section of the energy absorption element (crash element), e.g. a bending strip, connected to the adjusting unit, is passed in the longitudinal direction through a through opening in a wedging lever or wedging housing, which, for its part, is supported in the longitudinal direction on the holding element. In particular, for crash activation, during the actuation of the actuating element, i.e. during turning of the clamping spindle, a force is exerted on the wedging housing by the actuating element in the fixing position, with the result that the wedging housing is turned about an axis perpendicular to the longitudinal axis and to the clamping spindle. The fastening section of the energy absorption element is thereby tilted in the through opening, with the result that, when a force acts in the longitudinal direction, the oblique edge regions of the inner wall are pressed transversely to the longitudinal direction against the surface of the energy absorption element and clamp it. Owing to the frictional forces which arise, the energy absorption element is fixed in the longitudinal direction in the wedging housing, similarly to the adjustable clamping arm on the rail of a C-clamp. The compact construction and the possibility of fixing the steering column position in an infinitely variable manner in the longitudinal direction is advantageous with this type of activation of the crash device.

Crash activation upon actuation of the clamping device offers considerable gain in terms of safety for the vehicle occupants. However, the disadvantage in the prior art is that damage to the edges of the energy absorption element in the form of notches can arise each time locking is carried out by tilting within the through opening, as a result of which the energy absorption behavior and hence crash rating can be impaired. Moreover, adjustment of the steering column can be made more difficult by catching of the damaged edges.

Thus a need exists for a steering column that has improved crash activation, with which the energy absorption behavior and adjustability are not negatively affected, even by repeated locking.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally concerns steering columns for motor vehicles. In some examples, a steering column may comprise an adjusting unit, in which a steering spindle is mounted so as to be rotatable about the longitudinal axis thereof. The steering column may further include a holding unit, which can be connected to the body of the motor vehicle and which supports the adjusting unit. The steering column may further include a clamping device, which in a fixing position locks the adjusting unit in a normal mode relative to the holding unit and which in an unlocked position enables adjustment of the adjusting unit relative to the holding unit, at least in a longitudinal direction. At least one energy absorption element may be provided that extends into an opening of a wedging housing, parallel to the longitudinal direction, wherein the wedging housing is supported on the holding unit in the longitudinal direction in the normal mode. The clamping device may comprise an actuating element, which interacts with the wedging housing. In the unlocked position, the energy absorption element can be moved in the longitudinal direction in the through opening of the wedging housing. In the fixing position, the energy absorption element can be locked in the through opening of the wedging housing.

In some examples, the opening may have a wedging section with inner wall regions converging toward one another in a wedge shape in the longitudinal direction, at least in some section or sections. Further, at least one wedging element, which can be moved into the wedging section, may be arranged between the energy absorption element and the inner wall of the opening, wherein the sum of the dimensions of the wedging element and of the energy absorption element, when measured between the opposite inner walls, is larger than the smallest distance between the converging inner wall regions.

According to the invention, one special feature is that the opening, referred to below with equivalent meaning as a gap or through opening, does not have a constant passage cross section over the longitudinal extent, as in the prior art, but the passage cross section narrows, at least in one region, referred to as the wedging region, preferably when viewed from the steering wheel side, i.e. narrows in the forward direction. This is achieved by virtue of the fact that at least two inner wall regions situated opposite one another transversely to the longitudinal direction are oblique with respect to one another, with the result that the passage cross section situated in between narrows, preferably in a wedge shape. This wedge-shaped configuration is preferably achieved by virtue of the fact that the inner wall passes through parallel to the longitudinal axis from one side of the through opening (parallel inner wall), while the opposite inner wall section slopes relative to the longitudinal axis (sloping inner wall). This has the advantage that the fastening section of the energy absorption element can be passed through the through opening parallel to the longitudinal axis while resting on the parallel inner wall. A gap space, in which a wedging element can be arranged, as explained below, said space likewise converging in a wedge shape, is formed between the surface of the energy absorption element which faces away from the parallel inner wall and the sloping inner wall.

The opening can be designed as a blind opening, that is to say that this opening is closed at one end. However, this opening is preferably designed as an opening which is open on both sides, that is to say that the opening is not closed at either of its ends.

The term "wedge-shaped" should be taken to mean any type of narrowing, or in other words any arrangement of the inner wall regions which involves a reduction in the gap width.

The energy absorption element or the fastening section thereof is locked by means of a wedging element, which is arranged between one surface of the energy absorption element and an inner wall of the through opening. In this case, the overall dimension of the energy absorption element, together with the wedging element arranged adjacent thereto, i.e. on said absorption element or next to it, is smaller, when measured transversely to the longitudinal extent of the through opening, than the passage cross section of the through opening outside the wedging section, this corresponding to the largest passage cross section with which the through opening makes the transition to or enters the wedging section that narrows in a wedge shape. Consequently, the energy absorption element can be moved freely in the longitudinal direction in or through between the wedging element and the inner wall in this region in order to adjust the length of the steering column. Although the energy absorption element alone can be passed through the narrowing wedging region of the through opening, the smallest distance between the mutually converging inner wall regions (measured transversely to the longitudinal direction, i.e. between the opposite inner walls) in the wedging region falls below the overall dimension of the energy absorption element plus the wedging element arranged adjacent thereto in the transverse direction. The overall dimension, i.e. the sum of the individual dimensions, is measured in the same direction as the distance between the opposite inner walls. If the wedging element is moved forward into the wedging region that narrows in a wedge shape, it comes into contact with the surface of the energy absorption element and the inner wall surface sloping relative thereto and is trapped in the wedge-shaped gap space between these two surfaces. A further exertion of force in the longitudinal direction, preferably forward, on the wedging element leads to a correspondingly higher transverse force and thus to wedging between the oppositely sloping surfaces transversely to the longitudinal extent, wherein the energy absorption element, which is in series with the wedging element in the force flow transversely to the longitudinal direction, is likewise pressed against the opposite inner wall by the effective transverse force and is thus clamped nonpositively between the wedging element and the inner wall of the through opening. To this extent, the operation according to the invention for locking the energy absorption element on the holding element is comparable to a chuck, in which a wedging element is displaced along a wedging slope formed by an oblique plane in order to exert a transverse force perpendicularly to this plane on a workpiece for the purpose of clamping, or with a freewheel, which locks when there is a forward movement of the energy absorption element.

The inner wall preferably has a flat slope relative to the longitudinal axis, i.e. the sloping wedging section of the inner wall encloses an acute angle $\alpha$ with the longitudinal axis which is preferably less than 45°, particularly preferably less than 20° and, preferably along the wedging section, preferably in the forward direction, can continuously increase between 0° and 45°, preferably 20°. The angle should preferably lie in the friction cone to ensure that self locking is achieved. By means of the acute angle $\alpha$, a transverse force F exerted on the wedging element in the longitudinal direction is intensified in a manner dependent on the angle in accordance with F/tan $\alpha$, as a constant force with which the wedging element presses the energy absorption element against the inner wall. By means of this angle-dependent force multiplication, a sufficiently high wedging force for reliable fixing of the energy absorption element in the wedging housing can be produced. The wedging housing, for its part, is supported in the longitudinal direction on the holding unit, with the result that the energy absorption element is situated in the force flow between the adjusting and holding units and can thus absorb energy in the event of a crash when there is a relative movement of the adjusting and holding units.

One particular advantage of the invention is that the energy absorption element is clamped flat against the inner wall of the through opening, transversely to the longitudinal direction, by the wedging element, and therefore there are no point loads which could lead to damage to the edges of the energy absorption element. Impairments of the energy absorption capacity (crash rating) and impairments of adjustment are thereby largely excluded, even in the case of repeated fixing in the same position. The functional reliability and durability of the steering column are thus increased.

One advantageous embodiment of the invention envisages that the wedging element is designed as a rolling element, which can be made to roll in the longitudinal direction on the energy absorption element and/or the inner wall of the through opening. As a rolling element, it is possible, for example, to use a cylindrical roller or needle, the axis of rotation of which is aligned transversely to the longitudinal axis, allowing it to roll in the longitudinal direction in the through opening. Other known forms of rolling element can likewise be used. In the case of a relative movement of the adjusting unit and the holding unit of the kind which occurs both during adjustment of the steering wheel position and also in the event of a crash, the rolling element can roll on the surface of the energy absorption element or the inner wall of the through opening, thereby making possible relatively low-friction movement within the through opening, especially also during the displacement of the wedging element into the wedging section. This favors easy execution of the adjustment function and also secure clamping of the energy absorption element in the event of a crash.

Provision is preferably made for the rolling element to have a greater hardness than the energy absorption element and/or the wedging housing. It is thereby possible to ensure that the rolling element is not permanently deformed to a significant extent during clamping by the transmission of the pressure between the wedging housing and the energy absorption element, something that is to the benefit of long-term functional reliability. Moreover, the rolling element can impress itself into the surfaces of the energy absorption element and/or the inner wall of the through opening at its contact surfaces. In the event of a crash, when the pressure on the contact surfaces likewise becomes particularly high owing to the effective longitudinal forces between the wedging housing and the wedging element, which are then particularly high, the rolling element can impress itself plastically, i.e. with plastic deformation, into the surfaces of the energy absorption element and/or the inner wall of the through opening. A particularly strong nonpositive and positive connection between the wedging housing and the energy absorption element can thereby be produced, making energy introduction into the energy absorption element particularly secure and reliable. The level of safety is thereby increased.

It is furthermore advantageous that the wedging element is mounted in a driver element. The driver element can be movable in the longitudinal direction relative to the wedging element and takes the wedging element along in the through opening when it is moved in the longitudinal direction relative to the wedging housing. It comprises a bearing cage or cage for the wedging element, which can surround the wedging element in only a loose way, with the result that the wedging element is moved in the longitudinal direction within the through opening when there is a relative movement of the wedging housing and the driver element. If the wedging element is designed as a rolling element, the driver element can be designed in a manner similar to a cage of a rolling bearing, wherein the rolling element can rotate during a relative movement of the wedging housing and driver element and can roll on the opposite surfaces of the energy absorption element and the inner wall. Through actuation of the driver element, i.e. movement in the longitudinal direction relative to the wedging housing, preferably forward, the wedging element can be moved into the wedging region of the through opening. This activates the crash device, and a forward movement of the energy absorption element relative to the holding unit, of the kind which occurs in the event of a crash, leads to clamping of the energy absorption element in the wedging housing.

The invention preferably provides for the actuating element to comprise a rotatably mounted clamping axis, which is arranged transversely to the longitudinal axis and which can be rotated to actuate the clamping device and has at least one cam element, which can be moved toward the wedging housing parallel or perpendicularly to the longitudinal axis. By rotating the actuating element, e.g. by means of an actuating lever mounted on the clamping spindle, it is possible to actuate a clamping mechanism known per se, e.g. one having wedging cams, a tilting pin system, rocker levers or the like, which can be moved out of the fixing position into the unlocked position to adjust the steering column. If the clamping mechanism is fixed, the holding unit is clamped to the adjusting unit, on the one hand, and, on the other hand, the wedging housing according to the invention can be moved transversely relative to the clamping spindle by the cam element, which is eccentric with respect to the clamping spindle, in principle parallel or even perpendicularly to the longitudinal axis. This gives rise in an advantageous manner to various possibilities for implementing crash activation.

One embodiment of the invention envisages that the cam element can be moved toward the wedging housing parallel to the longitudinal axis and pushes together the wedging housing and the driver element in the longitudinal direction. For this purpose, the driver element can be mounted in a fixed manner in the longitudinal direction, i.e. so as to be movable relative to or on the clamping spindle. The wedging housing can be moved toward the driver element by the cam element, oriented radially outward from the clamping spindle, parallel to the longitudinal direction, preferably toward the rear, with the result that the wedging element is moved in the longitudinal direction in the wedging housing, preferably forward, as far as the beginning of or into the wedging section of the through opening. As an alternative, a further cam element can be mounted on the clamping spindle, said cam element acting on the driver element and moving it actively in the opposite longitudinal direction to the wedging housing during a rotation of the clamping spindle, i.e. preferably forward, with the result that the clamping element mounted on the driver element is likewise moved in the direction of the wedging section of the through opening. In this embodiment, the actuation, i.e. rotation of the clamping spindle, out of the unlocked position into the fixing position, brings about a relative movement of the wedging housing and the driver element in the longitudinal direction. More specifically, the driver element is moved actively in the longitudinal direction toward the wedging housing during the closure of the clamping device, wherein the wedging element is moved, preferably forward, to or into the wedging section in the through opening. In this case, the wedging element is pressed against the energy absorption element by the inner walls that converge in a wedge shape, with the result that said energy absorption element is clamped in the wedging housing, which is supported in the longitudinal direction on the holding unit. This brings about crash activation in the fixing position of the clamping device and, during a crash, in the process of crash activation, the energy absorption element is situated in the force flow between the adjusting and holding units, which are moved toward one another in the longitudinal direction during this process, and is deformed, while absorbing energy.

In another embodiment of the invention, it is envisaged that the cam element can be moved toward the wedging housing perpendicularly to the longitudinal axis, wherein the wedging housing acts on the driver element and fixes it on the adjusting unit. In this embodiment, the wedging housing and the driver element are not moved actively toward one another in the longitudinal direction during the closure of the clamping device, as in the previous embodiment, i.e. the wedging element is initially not moved into the wedging section. Instead, the driver element is locked on the adjusting unit during the closure of the clamping device, as a result of which crash activation takes place. In the event of a crash, the adjusting unit takes the driver element along forward and moves it relative to the wedging housing, which is supported in the longitudinal direction on the fixed holding unit. During this process, the driver element, for its part, takes the wedging element along, which is consequently moved in the longitudinal direction into the wedging section of the through opening and clamps the energy absorption element firmly in the wedging housing. The energy absorption element is then in the force flow between the holding and adjusting units and, during the relative movement of the holding and adjusting units, converts kinetic energy into plastic deformation.

To implement the last-mentioned embodiment, it is advantageous that the driver element has a foot part, which is arranged between the wedging housing and the adjusting unit and on which at least one grip-enhancing element is formed on its side facing the adjusting unit. The grip-enhancing element or elements can comprise an adhesion- or friction-increasing coating for example, e.g. consisting of a polymer, thereby improving the nonpositive engagement between the driver element and the adjusting unit. As an alternative or in addition, at least one positive engagement element can be provided, e.g. a sharp-edged, burr-like projection or a knob-like embossed feature, which digs into the surface of the adjusting unit, or hard particles, which have a greater hardness than the surface of the adjusting unit and are bonded to the foot part or, if appropriate, can additionally be embedded in a polymer layer, with the result that they ensure positive engagement at the microscopic level under contact pressure. No adhesion-increasing measures are taken on its side facing the wedging housing, and therefore the adhesion force in relation to a relative movement in the longitudinal direction between the driver element and the adjusting unit is higher than between the wedging housing and the driver element. This ensures that the driver element is reliably taken along by the adjusting unit in the event of a crash and is moved in the longitudinal direction toward the wedging housing. The wedging housing is supported on the holding device, with the result that the wedging element enters the wedging section and reliably locks the energy absorption element on the wedging housing. By means of the grip-enhancing element, the functional reliability of the crash activation system is thus increased.

The driver element preferably has a spring element, which can be supported in the longitudinal direction, preferably toward the front, against the wedging housing. The spring element can preferably be designed as a compression spring, which is preferably directed against the end of the wedging housing on the steering wheel side, i.e. the rear side. The length of the spring element can be dimensioned in such a way that, owing to the spring force acting between the driver element and the wedging housing in a manner dependent on the spacing, the wedging element is held in the through opening outside, i.e. in front of, the wedging section with the inner walls converging in a wedge shape in the unloaded state. In the above-described first embodiment of the invention, the spring element is compressed counter to its spring force during crash activation, namely when the wedging housing and the driver element are moved toward one another by eccentric cam elements or the like as the clamping device is closed in order to move the wedging element into the wedging section and, in the process, to clamp the energy absorption element in the wedging housing. During the opening or release of the clamping device, the spring element ensures that, as the cam element or elements is/are pivoted out, the wedging element is automatically pulled rearward in the longitudinal direction out of the wedging section of the through opening and the energy absorption element can be moved freely in the longitudinal direction relative to the wedging housing for longitudinal adjustment of the steering column. In the alternative embodiment of the invention which has furthermore been described above, in which the wedging housing is clamped on the adjusting unit for crash activation, the spring element ensures that the wedging element is always held outside, i.e. in front of, the wedging section of the through opening in the normal mode. Only in the event of a crash is the driver element moved forward against the wedging housing in the longitudinal direction, wherein the spring element is compressed.

The energy absorption element can have a bending wire and/or a tear tab. Bending wire, tear tabs and combined bending/tear tabs are reliable and proven energy absorption elements, which allow energy absorption by conversion of the kinetic energy introduced in the longitudinal direction into the steering column in the event of a crash into deformation energy by bending or tearing. Owing to the fact that they have a shape which is elongate parallel to the longitudinal axis and is strip-like, they are well suited to use in an arrangement according to the invention for crash activation. The through opening in the wedging housing can be adapted to the cross-sectional shape of a fastening section of the respective design of the energy absorption element, e.g. for a flat fastening strip as a relatively narrow gap which extends transversely to the longitudinal direction.

In principle, it is conceivable and possible for the adjusting unit to comprise an inner casing tube, which is arranged in or on the holding unit in a manner which allows a telescopic movement in the longitudinal direction, said holding unit comprising an outer casing unit. In this embodiment, the inner casing tube is pushed into the outer casing unit forward in the longitudinal direction in the event of a crash, wherein an energy absorption element is inserted in the force flow between the inner casing tube and the casing unit to absorb energy. In this case, the crash activation system according to the invention envisages that the energy absorption element is secured on the inner casing tube and the wedging housing is supported on the outer casing unit.

As an alternative, the holding unit can be designed as a bracket unit for fastening on a body of a motor vehicle, and in which an adjusting device can be accommodated in a longitudinally adjustable manner. In this embodiment, the entire adjusting unit can be moved forward in the longitudinal direction relative to the bracket unit in the event of a crash, wherein an energy absorption element is inserted in the force flow between a casing tube of the adjusting unit and the bracket unit to absorb energy.

Figure 1:
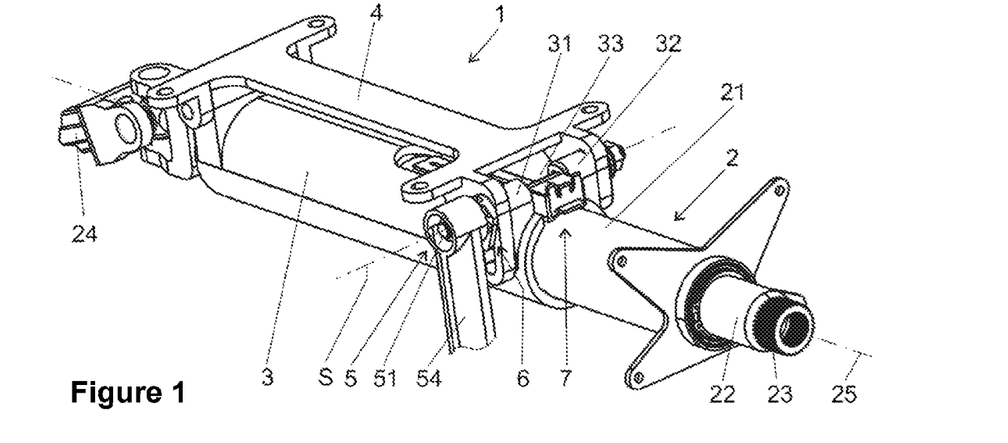
FIG. 1 is a schematic perspective view of an example steering column.

FIG. 1 shows a steering column 1, which comprises an adjusting unit 2, having a casing tube 21, in which a steering spindle 22 is mounted so as to be rotatable about the longitudinal axis 25. A steering wheel (not shown) can be secured on a section 23 of the steering spindle 22 which is at the rear in relation to the driving direction. The steering spindle 22 extends forward from the steering wheel side, where said rear section 23 is situated, through the adjusting unit 2 to the steering gear side, where the output shaft 24, also referred to as the intermediate steering shaft, is connected.

To designate the direction and orientation relative to the longitudinal axis 25, in the text which follows the term "front/forward" is used synonymously with "on the steering gear side"/"toward the front end of the vehicle" and the term "rear/rearward" is used synonymously with "on the steering wheel side"/"toward the rear of the vehicle".

The adjusting unit 2 is held in a holding unit 3 which, for its part, is secured on a bracket unit 4, which can be mounted on a body (not shown) of a motor vehicle. In the embodiment shown, the holding unit 3 forms an outer casing unit, in which the casing tube 21 of the adjusting unit 2 can be adjusted toward the front and toward the rear in the direction of the longitudinal axis 25 to adjust the steering wheel position.

The holding unit 3 comprises a recess, in which the adjusting unit 2 is accommodated, wherein the holding unit 3 comprises side sections 31 and 32, between which a slot 33 extends in the direction of the longitudinal axis 25 and on which a clamping force can be exerted transversely to the longitudinal axis 25 by a clamping device 5, as a result of which these side sections can be pressed together and the slot 33 is thus narrowed. It is thereby possible to clamp the casing tube 21 of the adjusting unit 2, said casing tube being arranged in the carrier unit 3, in the holding unit 3 in the closed position (fixing position) of the clamping device 5, while, in the release position (unlocked position) the holding unit 3 does not exert any clamping force on the casing tube 21, with the result that the adjusting unit 2 can be adjusted in the direction of the longitudinal axis 25, i.e. in the longitudinal direction L, in order to adjust the steering wheel position.

As an actuating element, the clamping device 5 has a clamping spindle 51, which is mounted so as to be rotatable about its axis of rotation S in the opposite side parts 31, 32 of the holding unit 3. A clamping lever 54 for manual rotation of the clamping spindle 51 is mounted for conjoint rotation on the clamping spindle 51.

Figure 2:
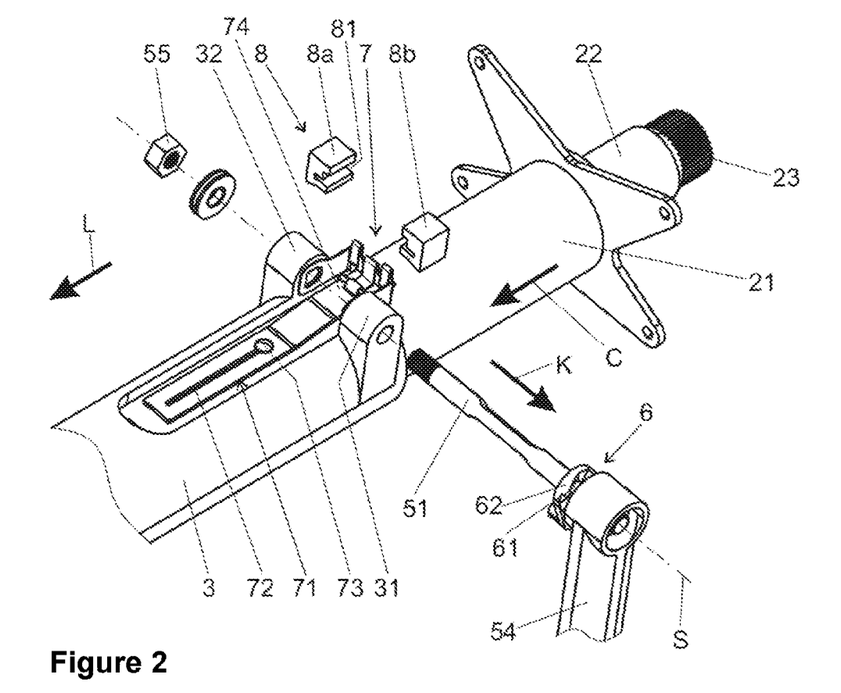
FIG. 2 is a partially disassembled view of a steering column in accordance with FIG. 1.

The clamping spindle 51 interacts with a clamping mechanism 6, which is clearly visible in the illustration in FIG. 2.

In the embodiment shown, the clamping mechanism 6 comprises a first cam disk 61, which is connected in a fixed manner to the clamping lever 54 and the clamping spindle 51, and a second cam disk 62, which is connected to side part 31 of the holding unit 3. The cam disks 61 and 62 have cams directed axially opposite to one another, which slide upon one another. To fix the adjusting unit 2, the clamping spindle 51 is turned by means of the clamping lever 54, with the result that the cams move out of a release position, in which a cam of one cam disk 61, 62 in each case engages in a recess between the cams of the respective other cam disk 62, 61, into a fixing position, in which the cams rest against one another axially by means of their raised portions. As a result, a clamping stroke K is exerted on the clamping spindle 51, this being indicated by the arrow K. The clamping spindle 51 is supported by means of the nut, which acts as an abutment 55, on side part 32, with the result that the clamping stroke K transmits a clamping force to the holding unit 3, whereby the side parts 31 and 32 are pressed against the casing tube 21 situated in between and the adjusting unit 2 is fixed in the holding unit 3 in relation to a movement in the longitudinal direction L.

As regards the size of the clamping stroke K, it should be noted that, in principle, this can be close to zero if the holding unit 3 is already surrounding the casing tube 21 of the adjusting unit 2 while being in contact therewith, with the result that all that is required for clamping is to increase the clamping force on the side parts 31 and 32, wherein these move toward the casing tube 21 to a slight extent. In practice, however, a minimum clamping stroke K will always occur, owing to the unavoidable elastic deformations of the holding unit 3 and of the clamping device 5, wherein this stroke can be in ranges between 0.5 mm and 4 mm.

An energy absorption device 7, also referred to as a crash device 7, comprises an energy absorption element 71, also referred to as a crash element, which, in the embodiment illustrated in FIGS. 1 to 6, is designed as an elongate tab in the form of a sheet-metal strip, which has a slotted hole 72 extending parallel to the longitudinal axis 25. The energy absorption element 71 designed as a tab is connected firmly to the casing tube 21 of the adjusting unit 2 by means of a fastening bolt 73 passed through at the rear end of the slotted hole 72. In the event of a crash, the casing tube 21 performs a movement relative to the holding unit 3, this being indicated by arrow C. Owing to the fact that the bolt 73 has a diameter which is larger than the width of the slotted hole 72, the slotted hole 72 is expanded by the bolt 73 during the relative movement of the bolt 73 and of the energy absorption element 71 designed as a tab in the event of a crash, and kinetic energy is absorbed or converted by the plastic deformation which takes place during this process.

In an embodiment which is not shown, the slotted hole 72 of the energy absorption element 71 is replaced by a stamped feature, similar to a perforation, which is torn open by the bolt 73 as it moves during a crash. This makes it possible to provide greater energy absorption. It is also conceivable and possible for no stamped feature to be provided and, in this way, even greater energy absorption can be made available.

Figure 3:
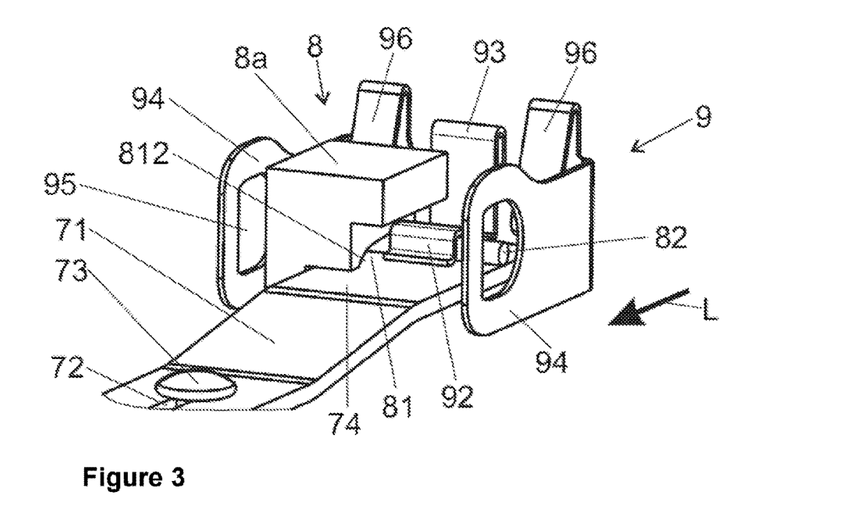
FIG. 3 is a detail view of an example clamping device with crash activation of the steering column in accordance with FIG. 1.

The crash device 7 has a wedging housing 8, which is assembled from two symmetrically constructed housing halves 8a and 8b perpendicularly to the longitudinal axis 25. In FIG. 3, the housing half 8b which is at the front in this view has been omitted to give a better view. From this it can be seen that the wedging housing 8 has a through opening 81, also referred to as a gap 81, which is continuous in the longitudinal direction L and through which a fastening section 74 of the energy absorption element 71 designed as a tab is passed.

Arranged in the region of the fastening section 74, adjacent to the energy absorption element 71 designed as a tab, is a wedging element 82, which is designed as a needle or roller 82 in the example shown. As can be seen from FIG. 12, where an enlarged schematic section through the wedging housing 8 is shown, the sum of the dimensions of the wedging element 82 designed as a rolling element and of the fastening section 74 of the energy absorption element 71, measured transversely to the longitudinal direction, i.e. the thickness D of the fastening section 74, together with the diameter A of the wedging element 82 arranged adjacent thereto and designed as a roller, is less than the dimension H of the largest passage cross section in the rear region 811 of the through opening 81. Thus, the energy absorption element 71 designed as a tab can be moved freely in the longitudinal direction L when the rolling element 82 is situated in this region 811 of the through opening 81.

Figure 12:
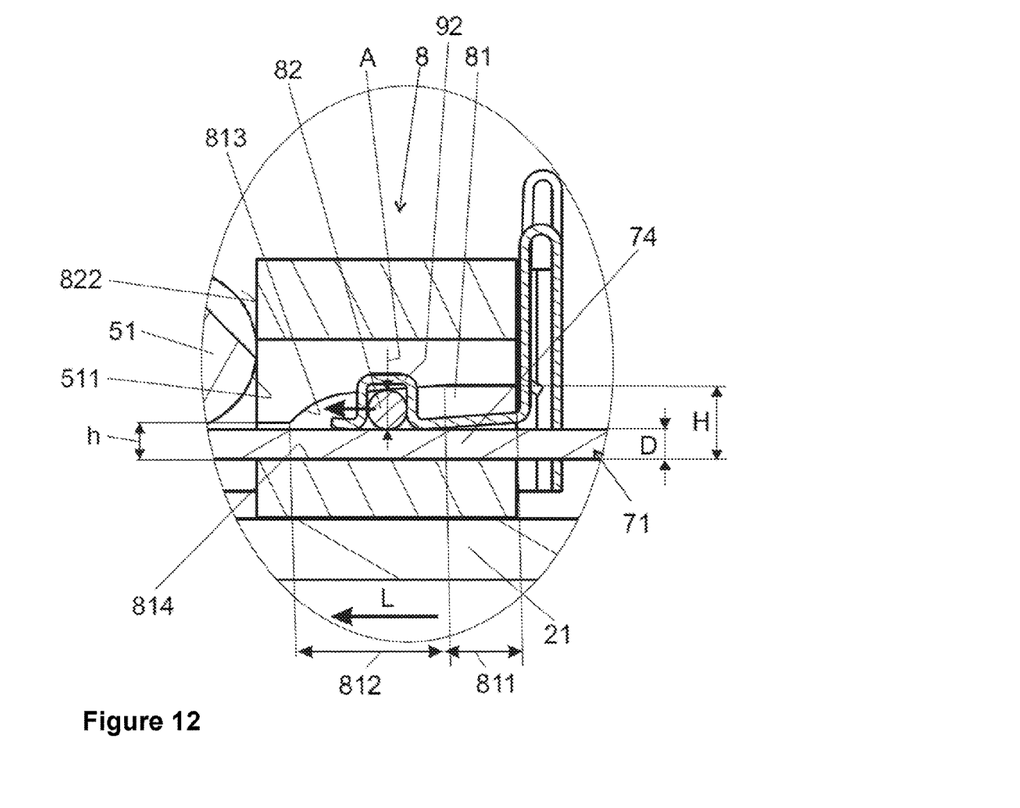
FIG. 12 is a detailed section view through an example wedging housing of a clamping device in accordance with FIGS. 1 to 7, wherein elements of a steering column have been omitted to improve clarity.

Formed in the front region of the through opening 81 is a wedging section 812, in which the sloping inner wall region 813 converges in a wedge shape with the opposite inner wall 814. As a result, the passage cross section in the wedging section 812 tapers in a wedge shape toward the front. At the front end, the through opening 81 has a dimension h, measured transversely to the longitudinal direction, which is smaller than the dimension H in the rear region 811. The thickness D of the energy absorption element 71 designed in the example as a tab is less than h, with the result that the tab can be moved through the through opening 81 on its own in the longitudinal direction L. The wedging element 82, which can be designed as a rolling element, for example, has a thickness A transversely to the longitudinal direction. The sum of the dimensions consisting of the thickness A of the wedging element 82 and the thickness D of the fastening section 74 of the energy absorption element 71 between the opposite inner walls 813, 814 (that is to say measured transversely to the longitudinal direction) is greater here than the dimension h of the smallest passage cross section of the wedging section 812. If the rolling element, the wedging element 82, is moved forward in the direction of the arrow into the wedging section 812, it is wedged in between the sloping inner wall region 813 and the fastening section 74 of the tab 71. The fastening section 74 is thereby pressed against the opposite inner wall 814, and the tab, the energy absorption element 71, is thus fixed nonpositively in the through opening 81 of the wedging element 73. This activates the crash device 7, i.e. if the adjusting unit 2 or the casing tube 21 thereof is then moved forward in the longitudinal direction L relative to the wedging housing 8 in a crash, the fastening section 74 of the energy absorption element 71 is likewise moved forward, wherein the wedging element 82, which is already wedged between the fastening section 74 of the energy absorption element 71 and the sloping inner wall region 813, is taken along forward and, in the process, taken along in the longitudinal direction L into the wedging section 812. As a result, in turn, the fastening section 74 of the energy absorption element 71 is clamped even more firmly in the through opening 81. The clamping is particularly effective if the wedging element 82 is designed as a rolling element, e.g. as a roller or needle, as illustrated. This is because the wedging element 82 designed as a rolling element can roll on the sloping inner wall region 813 and on the upper side of the fastening section 74 of the energy absorption element 71, said upper side facing said inner wall region, with the result that the movement in the longitudinal direction into the wedging section 812 can take place with relatively little friction and, accordingly, a high wedging force is exerted on the fastening section 74 of the energy absorption element 71. This ensures that, for energy absorption, the energy absorption element 71 is fixed particularly securely in the force flow between the adjusting unit 2 and the holding unit 3 in the event of a crash.

Figure 4:
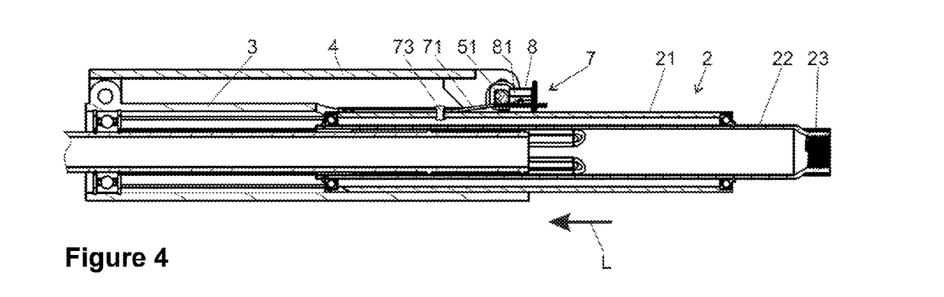
FIG. 4 is a longitudinal section view through the steering column in accordance with FIG. 1.
Figure 5:
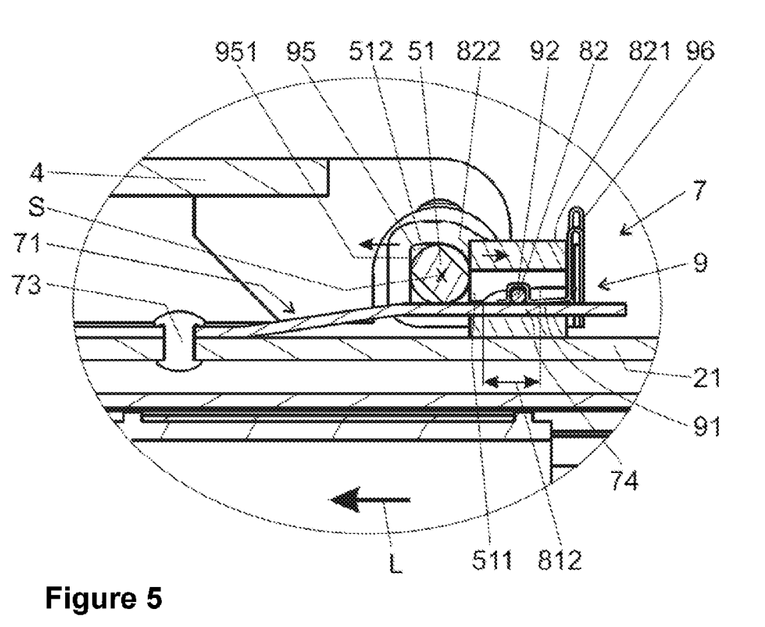
FIG. 5 is a longitudinal section view through the clamping device of the steering column in accordance with FIG. 4 in a fixing position.
Figure 6:
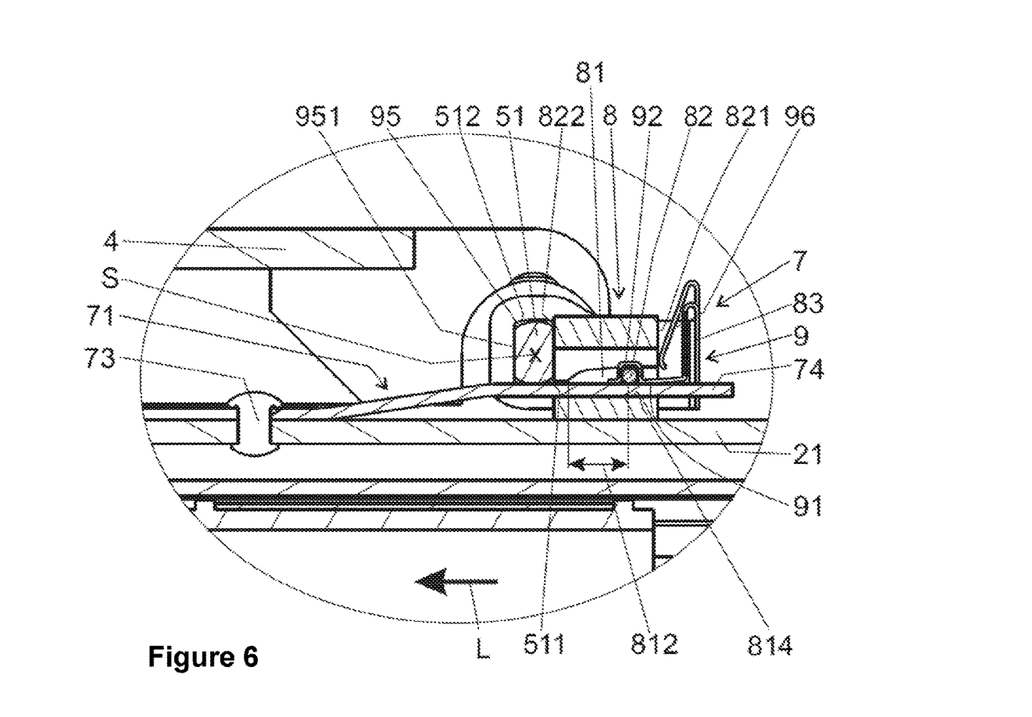
FIG. 6 is a sectional view of the clamping device in accordance with FIG. 5 in an unlocked position.

In FIGS. 4, 5 and 6, a first embodiment of a crash device 7 according to the invention is shown, wherein the energy absorption element 71 is designed as in FIG. 3. In this embodiment, the wedging element 82 is mounted in a driver element 9. More specifically, the driver element 9 has a holding arm 91, which, in its front end region, has a cage section 92, in which the wedging element 82 designed as a rolling element is held loosely as in a rolling bearing, with the result that it can rotate freely about its instantaneous pole but is held on the driver element 9 in the longitudinal direction. The holding arm 91 extends forward in the longitudinal direction L from a supporting element 93, which, for its part, extends in a plate shape transversely to the longitudinal axis 25. Furthermore, two lateral driver arms 94 extend from the supporting element 93, said arms lying opposite one another parallel to the longitudinal axis 25 in the direction of the axis S of the clamping spindle 51. In relation to the clamping spindle 51, the driver arms 94 have openings 95, which are formed coaxially and congruently and are designed as slotted holes extending in the longitudinal direction. A spring 96 is formed on the supporting element 93, said spring being designed as a leaf-shaped compression spring, which can be supported against the supporting element 93 in such a way as to yield resiliently from the front side, i.e. where the holding arm 91 and the driver arm 94 are situated toward the rear, i.e. counter to the longitudinal direction L.

Figure 8:
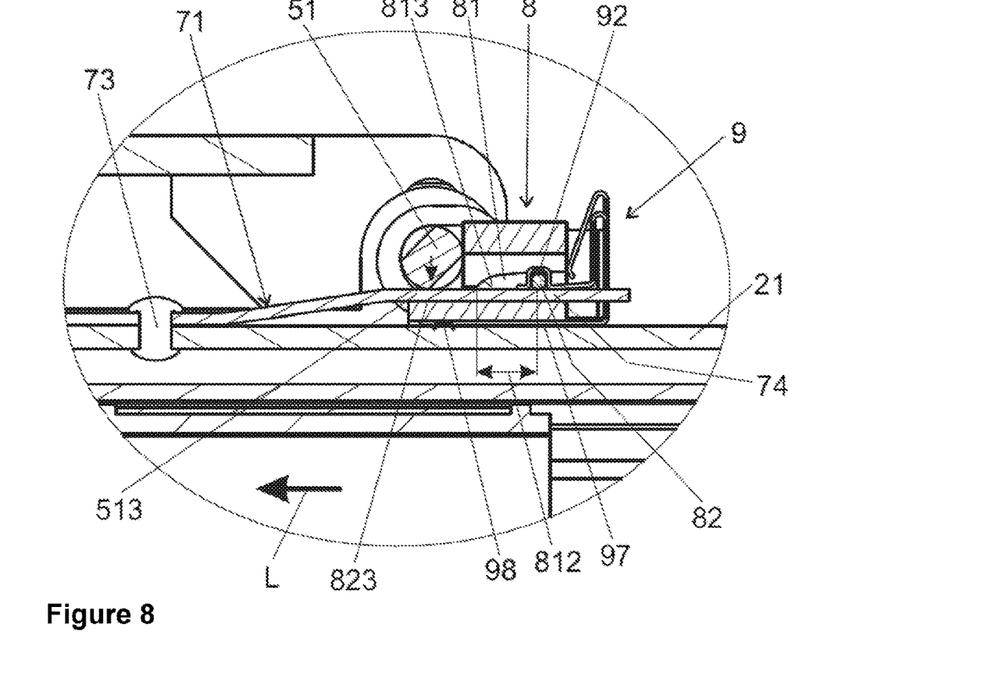
FIG. 8 is a sectional view of another example clamping device with crash activation in a fixing position.
Figure 9:
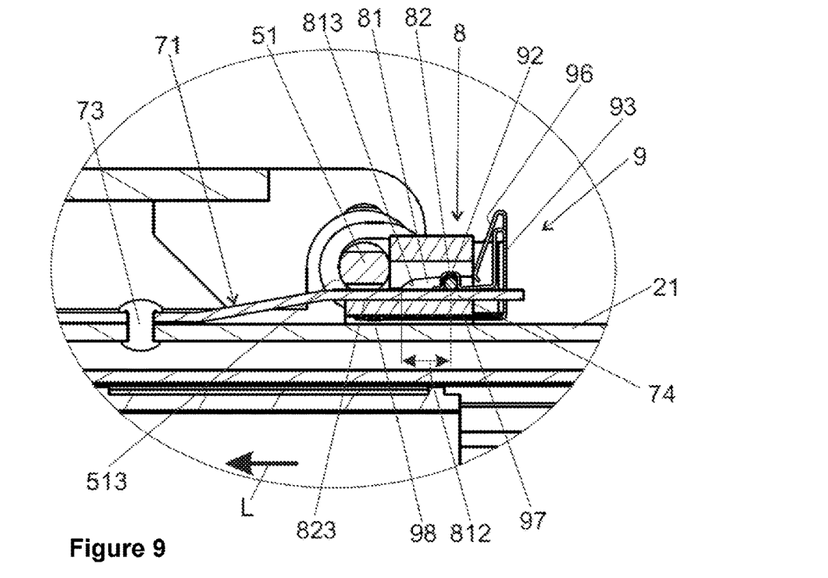
FIG. 9 is a sectional view of the clamping device of FIG. 8 with crash activation in an unlocked position.
Figure 10:
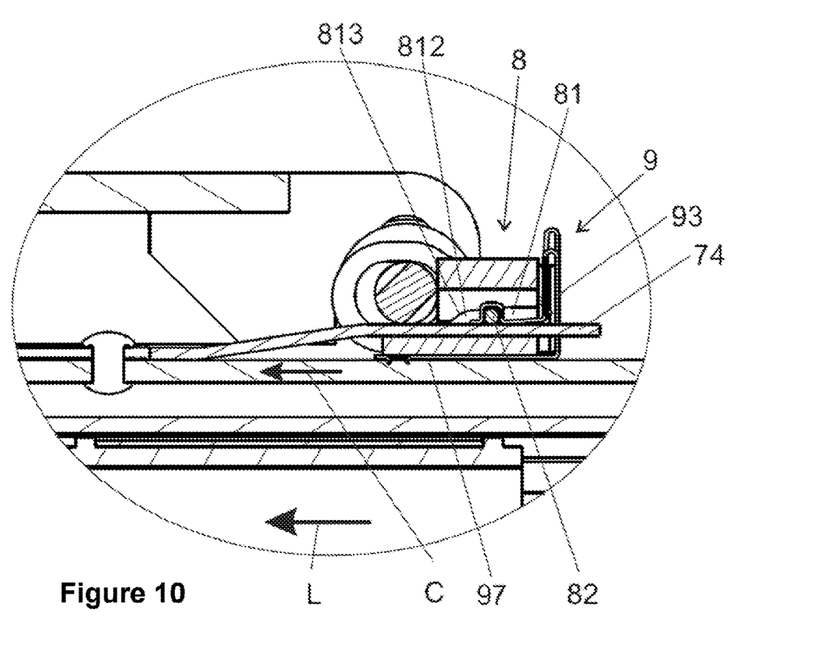
FIG. 10 is a sectional view of a clamping device with crash activation in accordance with FIG. 8 after crash triggering.
Figure 11:
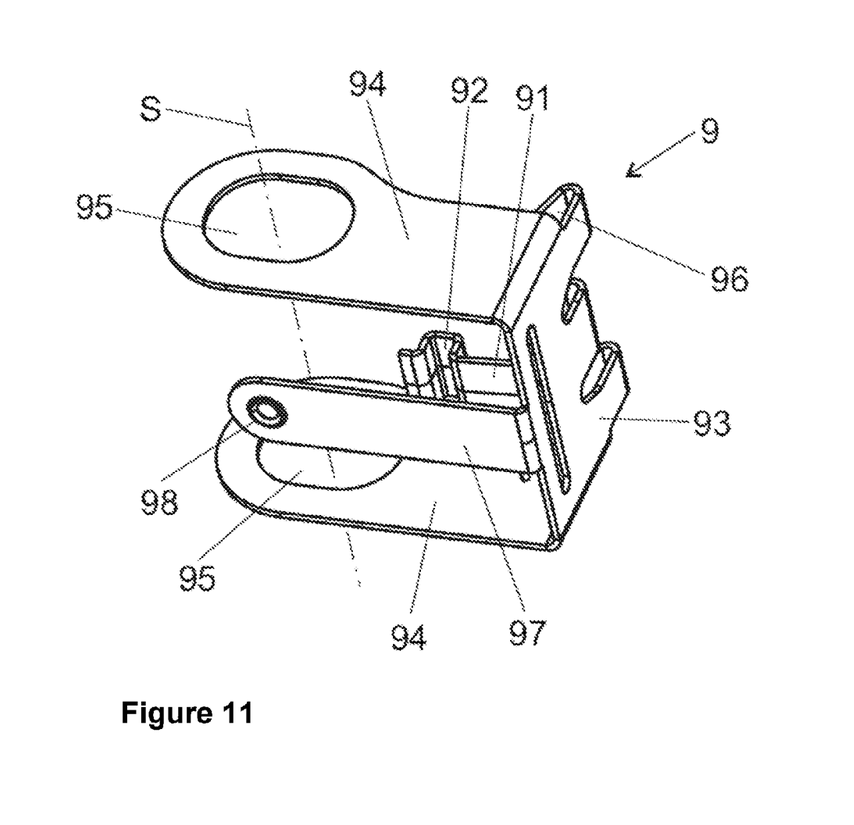
FIG. 11 is a perspective view of an example driver element in accordance with FIGS. 8 and 9.

In the second embodiment of the invention, which is reproduced in FIGS. 8, 9 and 10, the driver element 9, as illustrated in detail in FIG. 11, has an additional foot part 97, which is not present in the first embodiment in accordance with FIGS. 4, 5 and 6. The foot part 97 extends forward parallel to the holding arm 91 from the supporting element 93 in the region between the driver arms 94. On its lower side, which faces away from the holding arm 91, the foot part 97 can have positive engagement elements 98, which can be designed as sharp-edged, burr-like or blade-like projections, for example.

FIG. 6 shows the crash device 7 in the unlocked position, the crash device being implemented according to a first embodiment in a steering column 1 in accordance with FIG. 4. It is clearly apparent here that the wedging element 82 is mounted in the cage section 92 of the holding arm 91. The holding arm 91 extends in such a way from the rear in the longitudinal direction L into the through opening 81 that the wedging element 82 is outside, behind the wedging section 812. By virtue of the fact that the spring 96 is supported at the front on the rear end 821 (=that on the steering wheel side) of the wedging housing 8, the wedging element 82 is held in this position. In this case, the wedging element 82 has play with respect to the energy absorption element 71 in the through opening 81, transversely to the longitudinal direction, with the result that said energy absorption element can be moved in and counter to the longitudinal direction L relative to the wedging housing 8. Thus, the casing tube 21 of the adjusting unit 2 can be adjusted in the longitudinal direction relative to the bracket unit 4 to adapt the steering wheel position.

The clamping spindle 51 is passed through the openings 95 and rests by means of its outer circumference against the front end 822 of the wedging housing 8, at the rear in relation to the longitudinal axis 25, and against control surfaces 951 at the front in relation to the longitudinal axis 25, said control surfaces each being formed in the openings 95 of the driver element 9. If the clamping spindle 51 is now turned counterclockwise out of the unlocked position shown in FIG. 6 into the fixing position shown in FIG. 5, a first cam 511 projecting eccentrically from the clamping spindle 51 is moved rearward toward the front end 822 of the wedging housing 8, while a second cam 512, which likewise projects eccentrically from the clamping spindle 51 and which lies radially opposite the first cam 511, is pressed against the control surface 951 from the front. As a result, the driver element 9 and the wedging housing 8 move relative to one another, parallel to the longitudinal direction L, as indicated by the arrows in FIG. 4, wherein the spring 96 is compressed between the end 821 and the supporting element 93. This has the result that the holding arm 91 penetrates more deeply into the through opening 81 from the rear and, accordingly, the wedging element 82 is moved into the wedging region 812. The crash device 7 is thereby activated as described above.

If the clamping spindle 51 is moved clockwise out of the fixing position shown in FIG. 5 into the unlocked position shown in FIG. 6, the driver element 9 is supported by means of the spring 96 against the rear end 821 of the wedging housing 8, with the result that the wedging element 82 is moved rearward out of the wedging section 812 by the spring force, thus allowing the energy absorption element 71 once more to be moved freely in the longitudinal direction L.

Figure 7:
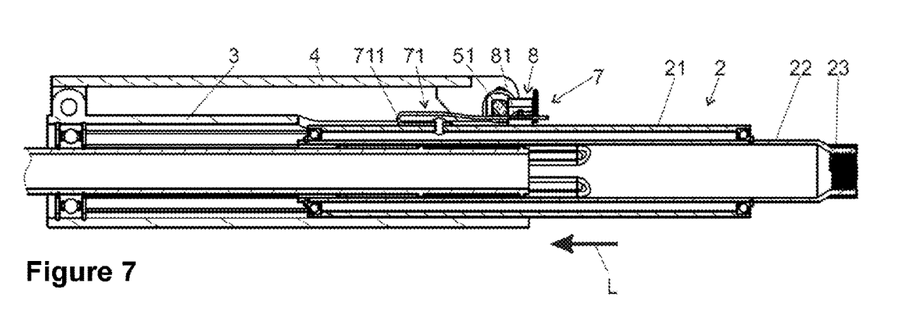
FIG. 7 is a side view of an example steering column similar to FIG. 4 with an alternative energy absorption element.

FIG. 7 shows a variant of the embodiment shown in FIG. 4, wherein the difference consists in that the energy absorption element 71 is designed as a bending strip with a bend 711. In the event of a crash, kinetic energy is converted into a bend. In other respects, the mode of operation is as described above.

FIGS. 8, 9 and 10 show a second embodiment of a crash device 7 according to the invention, wherein FIG. 9 shows the unlocked position, FIG. 8 shows the fixing position with crash activation and FIG. 10 shows the situation after a crash has taken place.

In contrast to the first embodiment described, crash activation is not accomplished by active relative movement of the wedging housing 8 and the driver element 9 through the actuation of the clamping device 5 but through locking the driver element 9 on the adjusting device 2 or on the casing tube 21 of the adjusting device 2 through actuation of the clamping device 5.

More specifically, the driver element 9 has a foot part 97, which extends forward from the supporting element 93, as shown in FIG. 11. In the installation position shown in FIGS. 8, 9 and 10, this foot part 97 is situated between the lower side of the wedging housing 8 and the outer or upper side of the casing tube 21, said side facing the housing. In this case, the foot part 97 preferably has positive engagement elements 98 on its lower side resting against the casing tube 21, or is provided there with a friction-increasing coating, e.g. composed of a polymer, thereby improving the nonpositive engagement between the driver element 9 and the casing tube 21—and hence the adjusting unit 2.

For crash activation, the clamping spindle 51 has an eccentrically projecting cam 513, which can be moved in a direction toward a contact pressure surface 823 transversely to the longitudinal axis 25, i.e. parallel to a radial direction in relation to said axis. Here, the wedging housing 8 extends between the contact pressure surface 823 and the casing tube 21 or the adjusting unit 2 in this region, and consequently it can be pressed against the casing tube 21 by the cam 513. In the region of the contact pressure surface 823, the foot part 97 extends between the wedging housing 9 and the casing tube 21, as described.

In the unlocked position shown in FIG. 9, the energy absorption element 71 can be moved freely between the clamping spindle 51 and the contact pressure surface 823, and likewise the wedging housing 8 and the driver element 9 can be moved freely parallel to the longitudinal direction 2 relative to the casing tube 21, i.e. the lower side of the foot part 97 can slide along the surface of the casing tube 21. Thus, to adapt the steering wheel position, the adjusting unit 2 can be adjusted relative to the bracket unit 4, parallel to the longitudinal axis.

By rotating the clamping spindle 51 counterclockwise, the unlocked position shown in FIG. 9 is converted to the fixing position shown in FIG. 8. In this case, the cam 513 is pivoted from above, i.e. transversely to the longitudinal direction L, against the contact pressure surface 823, wherein the cam 513 presses the energy absorption element 7 in contact there against said contact pressure surface 823, as indicated by the arrow in FIG. 8. The wedging housing 8, which is situated in the force flow there in relation to the contact force, and the foot part 97 situated between the wedging housing 8 and the casing tube 21 are pressed against one another and against the casing tube 21. By means of the friction forces acting between the components situated in series in the force flow, the clamping spindle 51, the energy absorption element 7, the wedging housing 8, the foot part 97 and the casing tube 21 are connected nonpositively to one another in respect of a load in the longitudinal direction L.

By means of the positive engagement elements 98 on its lower side facing the casing tube 21, the foot part 97 digs into the surface of the casing tube 21, thereby additionally ensuring positive engagement, with the result that the connection between the driver element 9 and the casing tube 21 is stronger than the other, nonpositive connections mentioned. As an alternative or in addition, the connection between the foot part 97 and the surface of the casing tube 21 can also be reinforced by a friction-increasing coating on the lower side of the foot part 97.

If a large force acts in the longitudinal direction L on the steering wheel and the adjusting unit 2 connected thereto in the event of a crash, as is indicated by arrow C similarly to the illustration in FIG. 2, the casing tube 21 is moved forward and takes the driver element 9 along forward. By virtue of the above-described higher friction between the driver element 9 and the casing tube 21, the driver element 9 slides forward relative to the wedging housing 8, which is supported on the clamping spindle 51. As a result, the holding arm 91 enters more deeply forward into the through opening 81, and the wedging element 82 is moved forward into the wedging section 812 converging in a wedge shape, as indicated by the arrow in FIG. 10. As a result, the energy absorption element 71 is firmly clamped in the through opening 81 and, in this way, to the wedging housing 8, as has already been described in detail above with reference to FIG. 5. As explained, the force acting on the energy absorption element 71 in the longitudinal direction L leads to even stronger wedging of the wedging element 8, whereby the kinetic energy introduced in the event of a crash is introduced reliably into the energy absorption element 71 during an impact by a driver and can be absorbed or converted into deformation there.

Figure 13:
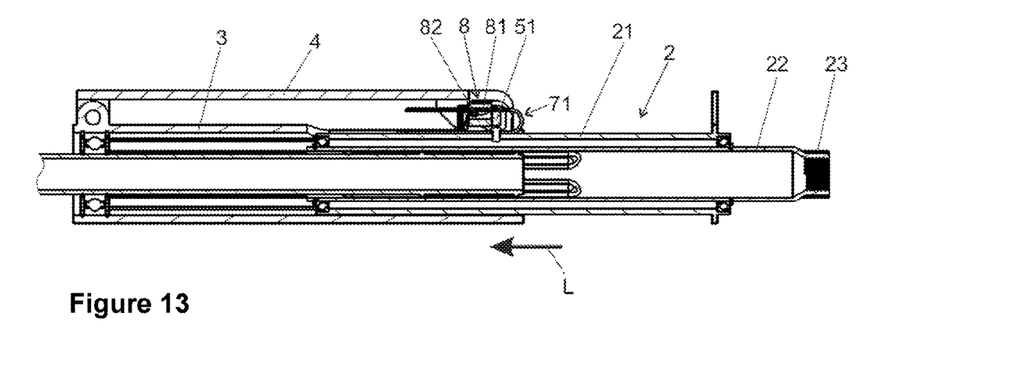
FIG. 13 is a sectional view of an example steering column similar to FIG. 4 with yet another example clamping device with crash activation in an unlocked position.
Figure 14:
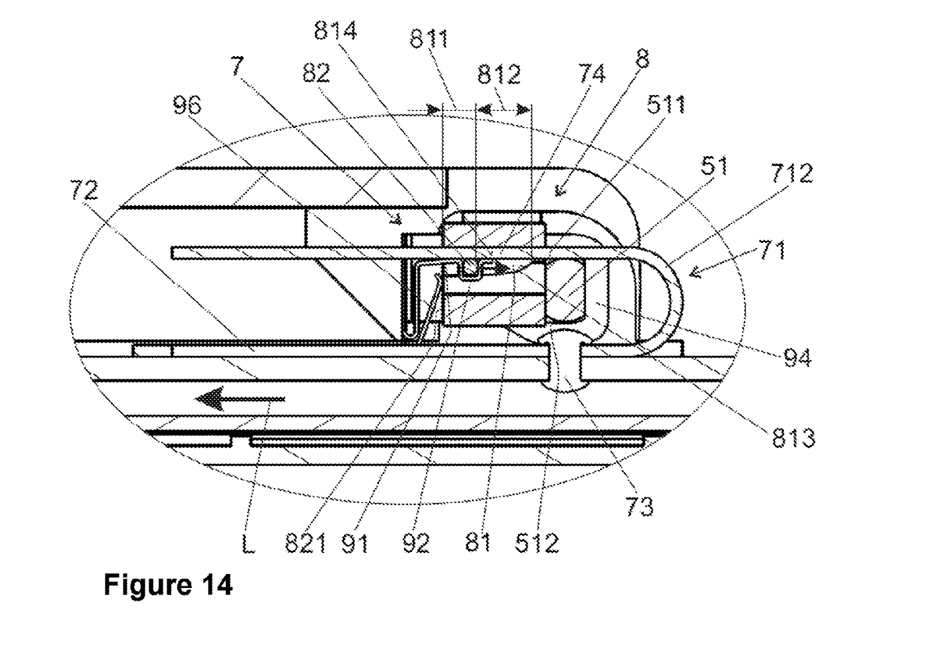
FIG. 14 is detailed section view through the clamping device with crash activation in accordance with FIG. 13.

FIGS. 13 and 14 show a steering column similar to FIG. 4 with a third embodiment of a clamping device according to the invention with crash activation in the unlocked position. It is clearly apparent here that the wedging element 82 is supported in the cage section 92 of the holding arm 91. The holding arm 91 extends in such a way in the longitudinal direction L into the through opening 81 that the wedging element 82 is situated outside and in front of the wedging section 812. Owing to the fact that the spring 96 is supported at the rear on the front end 821 (=that on the front side of the vehicle) of the wedging housing 8, the wedging element 82 is held in this position. In this case, the wedging element 82 has play with respect to the energy absorption element 71 in the through opening 81, transversely to the longitudinal direction, with the result that said energy absorption element can be moved in and counter to the longitudinal direction L relative to the wedging housing 8. Thus, the casing tube 21 of the adjusting unit 2 can be adjusted in the longitudinal direction relative to the bracket unit 4 to adapt the steering wheel position.

As can be seen from FIG. 14, the sum of the dimensions of the wedging element 82 designed as a rolling element and of the fastening section 74 of the energy absorption element 71, measured transversely to the longitudinal direction, i.e. the thickness of the fastening section 74, together with the diameter of the wedging element 82 arranged adjacent thereto and designed as a roller, is less than the dimension of the largest passage cross section in the front region 811 of the through opening 81. Thus, the energy absorption element 71 designed as a tab can be moved freely in the longitudinal direction L when the rolling element 82 is situated in this region 811 of the through opening 81.

Formed in the rear region (=that on the rear side of the vehicle) of the through opening 81 is a wedging section 812, in which the sloping inner wall region 813 converges in a wedge shape with the opposite inner wall 814. As a result, the passage cross section in the wedging section 812 tapers in a wedge shape toward the rear, i.e. in the direction of the rear end 23 of the steering spindle 22. At the rear end, the through opening 81 has a dimension, measured transversely to the longitudinal direction, which is smaller than the dimension in the front region 811 (=that on the front side of the vehicle). The thickness of the energy absorption element 71 designed in the example as a tab is less than the dimension at the rear end of the through opening 81, with the result that the tab can be moved through the through opening 81 on its own in the longitudinal direction L. The wedging element 82, which can be designed as a rolling element, for example, has a thickness transversely to the longitudinal direction. The sum of the dimensions consisting of the thickness of the wedging element 82 and the thickness of the fastening section 74 of the energy absorption element 71 between the opposite inner walls 813, 814 (that is to say measured transversely to the longitudinal direction) is greater here than the dimension of the smallest passage cross section of the wedging section 812. If the rolling element, the wedging element 82, is moved toward the rear (=the rear side of the vehicle) in the direction of the arrow into the wedging section 812, it is wedged in between the sloping inner wall region 813 and the fastening section 74 of the energy absorption element 71. The fastening section 74 is thereby pressed against the opposite inner wall 814, and the tab, the energy absorption element 71, is thus fixed nonpositively in the through opening 81 of the wedging element 73. This activates the crash device 7, i.e. if the adjusting unit 2 or the casing tube 21 thereof is then moved forward in the longitudinal direction L relative to the wedging housing 8 in a crash, the fastening section 74 of the energy absorption element 71 is initially moved forward until the bend 712 of the energy absorption element 71 comes to rest on the clamping spindle. The direction of movement of the fastening section 74 is then reversed, with the result that it moves rearward in the longitudinal direction, with the result that the wedged-in wedging element 82 is taken along toward the rear and, in the process, is taken along in the longitudinal direction L into the wedging section 812. As a result, in turn, the fastening section 74 of the energy absorption element 71 is clamped in the through opening 81. After the locking of the energy absorption element 71 in the crash device 7, the slotted hole 72, which is arranged in the energy absorption element 71, is expanded by the bolt 73, and kinetic energy is absorbed or converted by the plastic deformation which takes place during this process.

| List of reference signs | |
|---|---|
| 1 | steering column |
| 2 | adjusting unit |
| 21 | casing tube |
| 22 | steering spindle |
| 23 | rear section |
| 24 | output shaft |
| 25 | longitudinal axis |
| 3 | holding unit |
| 31, 32 | side section |
| 33 | slot |
| 4 | bracket unit |

-continued

List of reference signs

| | |
|---|---|
| 5 | clamping device |
| 51 | clamping spindle |
| 511 | first cam |
| 512 | second cam |
| 513 | cam |
| 54 | clamping lever |
| 55 | abutment |
| 6 | clamping mechanism |
| 61, 62 | cam disk |
| 7 | energy absorption device (crash device) |
| 71 | energy absorption element |
| 711 | bend |
| 712 | bend |
| 72 | slotted hole |
| 73 | bolt |
| 74 | fastening section |
| 8 | wedging housing |
| 81 | through opening |
| 811 | region |
| 812 | wedging section |
| 813 | inner wall region |
| 814 | inner wall |
| 821 | rear end |
| 822 | front end |
| 823 | contact pressure surface |
| 82 | wedging element (rolling element) |
| 9 | driver element |
| 91 | holding arm |
| 92 | cage section |
| 93 | supporting element |
| 94 | driver arms |
| 95 | openings |
| 951 | control surface |
| 96 | spring |
| 97 | foot part |
| 98 | positive engagement element |
| K | clamping stroke |
| L | longitudinal direction |
| S | axis |
| H | dimension of passage cross section |
| h | minimum dimension of passage cross section |
| D | thickness |

What is claimed is:

1. A steering column for a motor vehicle comprising:
an adjusting unit in which a steering spindle is mounted so as to be rotatable about a longitudinal axis of the steering spindle;
a holding unit configured to be connected to a body of the motor vehicle, wherein the holding unit supports the adjusting unit;
a clamping device, wherein in a fixing position the clamping device locks the adjusting unit in a normal relative mode to the holding unit, wherein in an unlocked position the clamping device enables adjustment of the adjusting unit relative to the holding unit at least in a longitudinal direction, wherein the adjusting unit is movable in the longitudinal direction in the normal relative mode when a predefined force is exceeded;
an energy absorption element that extends into an opening of a wedging housing parallel to the longitudinal direction, the opening including a wedging section with inner wall regions converging toward one another in a wedge shape in the longitudinal direction, wherein the wedging housing is supported on the holding unit in the longitudinal direction in the normal relative mode, wherein an actuating element of the clamping device interacts with the wedging housing, wherein in the unlocked position the energy absorption element is movable in the longitudinal direction in the opening of the wedging housing and in the fixing position the energy absorption element is lockable in the opening of the wedging housing; and
a wedging element that is movable into the wedging section of the opening, the wedging element being disposed between the energy absorption element and at least one of the inner wall regions of the opening,
wherein a sum of dimensions of the wedging element and the energy absorption element, as measured between the inner wall regions of the wedging section of the opening that oppose one another, is greater than a shortest distance between the inner wall regions that are converging.

2. The steering column of claim 1 wherein the wedging element is configured as a rolling element that rolls in the longitudinal direction on at least one of the energy absorption element or one of the inner wall regions of the opening.

3. The steering column of claim 2 wherein the rolling element has a greater hardness than at least one of the energy absorption element or the wedging housing.

4. The steering column of claim 1 wherein the wedging element is mounted in a driver element.

5. The steering column of claim 1 wherein the actuating element comprises a rotatably mounted clamping axis that is disposed transversely to the longitudinal axis, the actuating element being rotatable to actuate the clamping device and having a cam element that is movable toward the wedging housing parallel or perpendicularly to the longitudinal axis.

6. The steering column of claim 5 wherein the cam element is movable toward the wedging housing parallel to the longitudinal axis, wherein when moved the cam element pushes together the wedging housing and a driver element in which the wedging element is mounted in the longitudinal direction.

7. The steering column of claim 5 wherein the cam element is movable toward the wedging housing perpendicular to the longitudinal axis, wherein the wedging housing acts on a driver element in which the wedging element is mounted and fixes the driver element on the adjusting unit.

8. The steering column of claim 7 wherein the driver element includes a foot part that is disposed between the wedging housing and the adjusting unit, wherein a side of the foot part includes a grip-enhancing element that faces the adjusting unit.

9. The steering column of claim 1 wherein a driver element in which the wedging element is mounted comprises a spring element that is configured to be supported in the longitudinal direction against the wedging housing.

10. The steering column of claim 1 wherein the energy absorption element comprises at least one of a bending wire or a tear tab.

11. The steering column of claim 1 wherein the adjusting unit comprises an inner casing tube that is disposed in the holding unit in a manner that allows for a telescopic movement in the longitudinal direction, wherein the holding unit comprises an outer casing unit.

12. The steering column of claim 1 wherein the holding unit is configured as a bracket unit for fastening on the body of the motor vehicle, wherein the holding unit is configured to receive the adjusting unit in a longitudinally-adjustable manner.

* * * * *